Feb. 20, 1934.  E. G. PETERSEN  1,947,875
RADIATOR SHUTTER
Filed Feb. 4, 1931  3 Sheets-Sheet 1
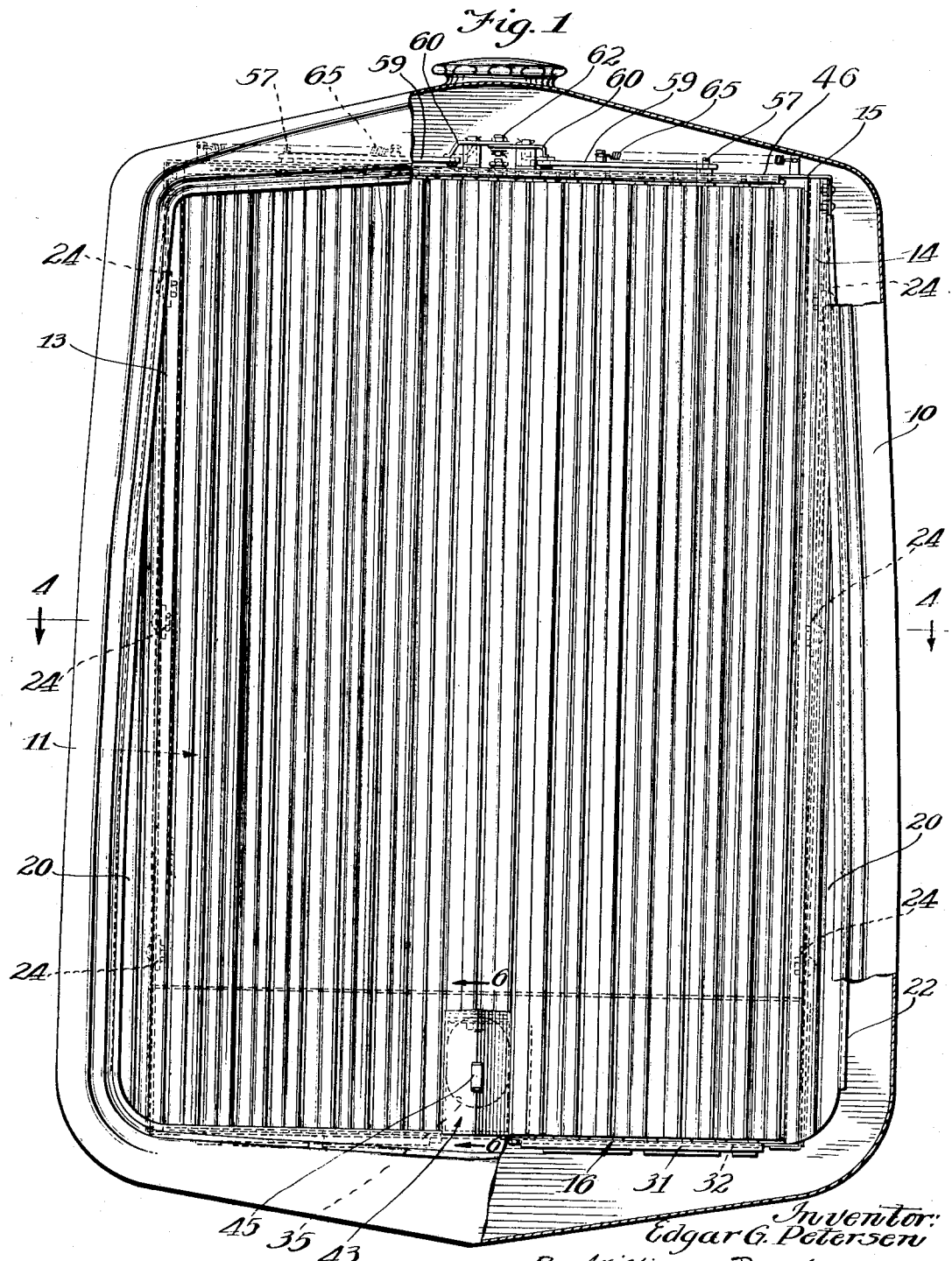

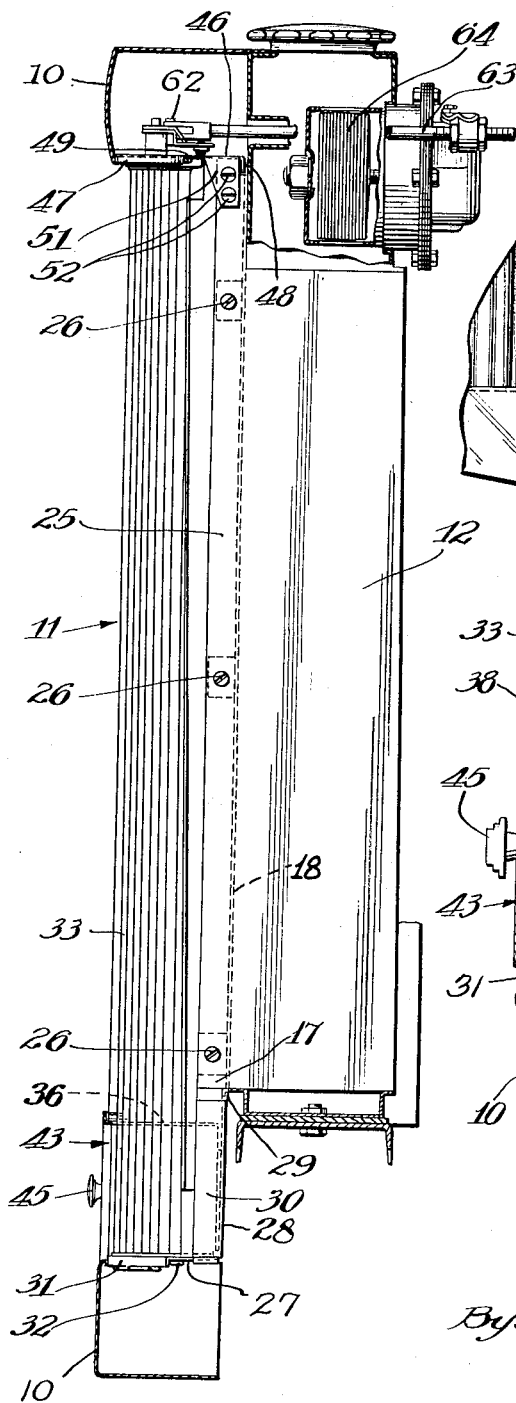
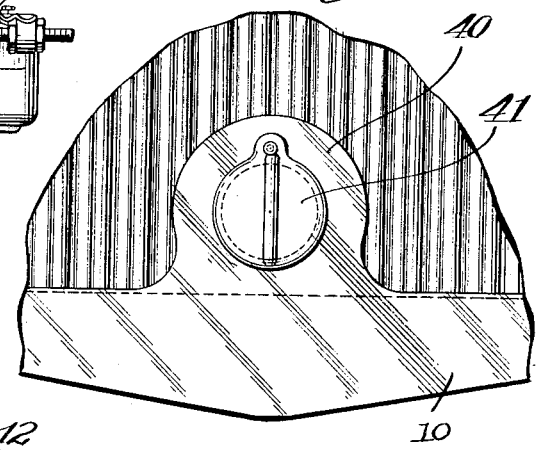
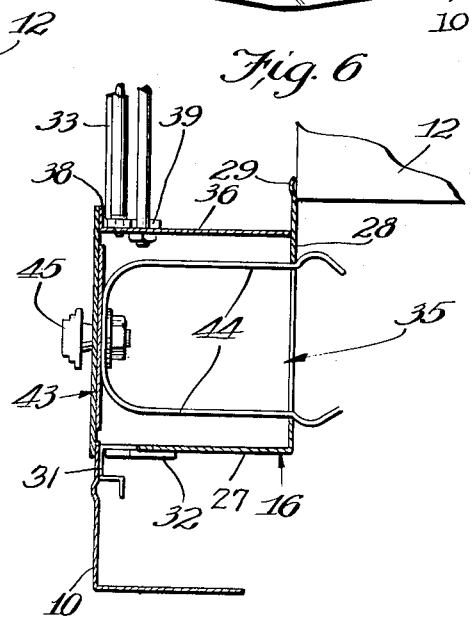

Feb. 20, 1934.  E. G. PETERSEN  1,947,875
RADIATOR SHUTTER
Filed Feb. 4, 1931  3 Sheets-Sheet 3
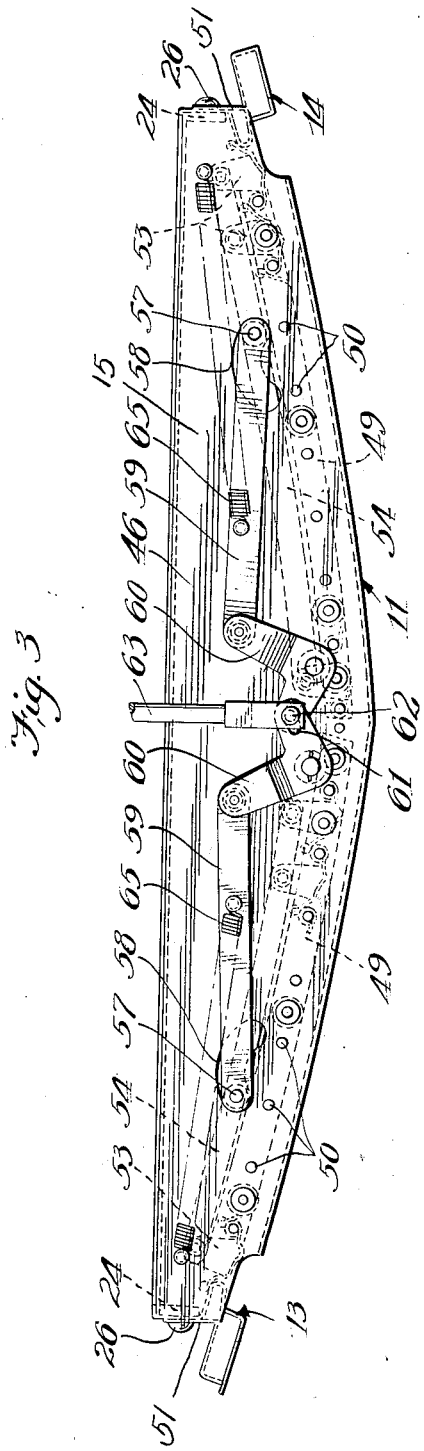
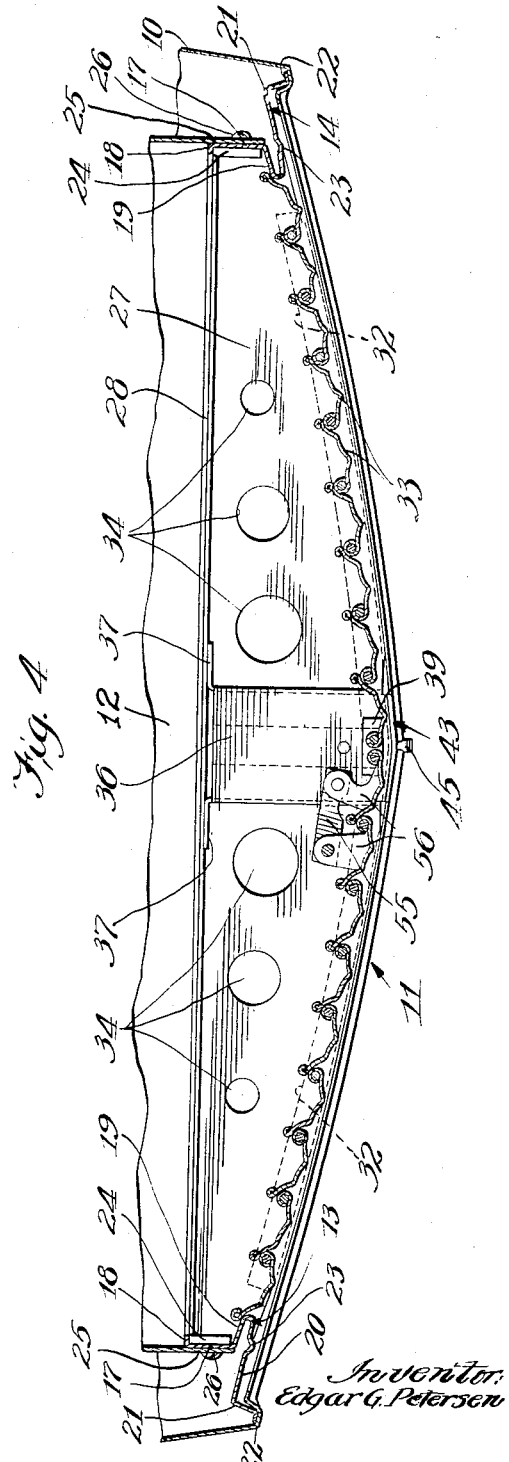
Inventor:
Edgar G. Petersen
By Williams, Bradbury,
McCaleb & Hinkle, Attys.

Patented Feb. 20, 1934

1,947,875

UNITED STATES PATENT OFFICE 1,947,875

RADIATOR SHUTTER

Edgar G. Petersen, Chicago, Ill., assignor to Pines Winterfront Company, Chicago, Ill., a corporation of Delaware Application February 4, 1931. Serial No. 513,278

19 Claims. (Cl. 189—62)

My invention relates to radiator shutters for automobiles and other automotive vehicles.

One of the objects of the invention is to provide an improved radiator shutter.

A further object of the invention is to provide an improved radiator shutter suitable for use with the radiator shell which is bent outwardly to give an arch or wide V effect.

A further object of the invention is to provide a radiator shutter having vertical shutter elements arranged to impart an appearance of great depth to the radiator.

A further object of the invention is to provide a radiator shutter in which means are provided for the escape or removal of stones, insects and other foreign bodies which may enter between the shutter elements.

A further object of the invention is to provide a radiator shutter which furnishes a compartment between the shutter elements and the radiator core, so that the shutter opening may be effectively employed with a core of smaller size.

A further object of the invention is to provide a radiator shutter embodying improved means for operating a plurality of sets of shutter elements from a single operating device.

A further object of the invention is to provide a radiator shutter adapted to provide the shell with lateral support.

Other objects, advantages, and capabilities of the invention will appear from the following description of a preferred embodiment thereof, taken in conjunction with the accompanying drawings in which Figure 1 is a front elevation, partly in section, showing a radiator shutter embodying my invention, mounted within a radiator shell.

Fig. 2 is a sectional view therethrough, the shutter and radiator core being shown in elevation.

Fig. 3 is a top plan view of the shutter.

Fig. 4 is a sectional view of same taken on the line 4—4 of Fig. 1.

Fig. 5 is a front elevational detail view showing a crank opening; and

Fig. 6 is a sectional detail view on the line 6—6 of Fig. 1.

Referring to the drawings, the radiator shell is designated by the numeral 10, the shutter as a whole by the numeral 11, and the radiator core by the numeral 12.

The radiator shutter 11 comprises a frame, which is constructed of two side frame members 13 and 14, an upper frame member 15, and a lower frame member 16. The side frame members 13 and 14 each comprise a vertical web 17 which is adapted to lie in a longitudinal vertical plane. The rear edge of the web 17 is turned inwardly as shown at 18 to provide a small strengthening flange. At its forward edge, the web 17 gives into an inwardly and forwardly directed web 19, which is turned or rolled in the reverse direction to provide an outwardly directed web, which increases in width from the downward direction, as will readily be seen in Fig. 1. Along its outer edge the web 20 gives into a forwardly directed web 21, the outer edge of which is bent outwardly to provide a flange 22 which is adapted to enter a bead in the face of the shell 10, as seen in Fig. 4. The web 20 may be provided with a longitudinal bead 23, which is parallel to the inner edge of the web 20 and imparts to said web an appearance simulating the shutters which are located between the side members 13 and 14, as will be hereinafter described.

The vertical webs 17 have secured thereto on their inner sides, preferably by spot welding blocks 24 which are provided with tapped openings in alignment with openings in the webs 17 and in flanges 25, which project forwardly from the frame of the radiator core as shown in Fig. 2. The shutter is secured to the core 12 by means of screws 26, which extend through the aligned openings and are threaded into the tapped openings in the blocks 24.

The lower frame member 16 comprises essentially a piece of sheet metal bent to an angle to provide a horizontal base portion 27 and a vertical apron 28 projecting vertically therefrom to a position adjacent the lower end of the radiator core 12. At its upper edge the apron 28 is ribbed as shown at 29 to strengthen same. At each end the apron 28 carries an extension 30 which extensions are bent forwardly to engage the outer sides of the vertical webs 17 adjacent their lower ends, the flanges 18 being cut away to permit this engagement. The extensions 30 are welded to the vertical webs 17 or are secured thereto in any other suitable manner. The forward edge of the horizontal base portion 27 is substantially in the form of a wide V, both sides of which are slightly convex. Around this edge the horizontal base gives into a vertical bead or web 31 upon which the inner edge of the lower portion of the shell 10 is adapted to abut. The metal of the bead 31 extends rearwardly and then downwardly to provide stiffness as shown in Fig. 6. Within the bead 31 is placed a bearing strip 32 which is secured to the underside of the base 27 along its forward edge. Openings extending through the base 27 and bearing strips 32 are provided to receive pintles of the shutter elements 33. The pintle openings are arranged in two series, one on each side of the center, each series being in a straight line.

The base 27 is provided with openings 34 whereby stones, bees, other insects, and other foreign bodies, which pass through the open shutters into contact with the radiator may escape. A crank opening 35 is provided in the apron 28 and is surrounded by a shield or box-like structure 36, which may be provided with flanges 37 by which it may be secured to the apron 28, for example by welding. The upper portion of the shield 36 is turned upwardly at its forward edge to provide a flange 38, behind which is mounted a short bearing strip 39, which provides openings for the lower pintles of the two center elements which are shorter than the remainder of the shutter elements to permit the provision of the crank opening 35.

The forward opening of the shield 36 may be closed in any suitable way. For example as shown in Fig. 5, the shell 10 may be provided with an extension 40 which lies over the forward end of the shield 36, said extension being provided with an opening in alignment with the crank opening 35, which opening is provided with a conventional closure 41.

Or, as shown in Fig. 6, I may provide a closing plate 43 having rearwardly extending resilient members 44 adapted to enter the opening 35 and secure the closing plate 43 in position. As shown in Fig. 1, the closure plate 43 is preferably ribbed to simulate the shutter elements, and is provided with a handle 45.

The upper frame 15 comprises a sheet metal plate 46 substantially corresponding to the shape of the base 27. Its forward and rearward edges are turned downwardly to provide flanges 47 and 48 respectively, against which former flange the inner edge of the upper part of the radiator shell 10 abuts. Upon the lower side of the plate 46 is mounted a pair of bearing strips 49, holes 50 extending through the plate 46, and the strips 49 to provide bearings for the upper pintles of the shutter elements 33. These openings 50 are positioned vertically above the openings in the base 27 and the openings in the bearing strip 49 and the shutter elements 33 are secured in position in said openings in the usual manner. At each end the plate 46 is provided with a downwardly directed lug 51 whereby it may be secured to the upper ends of the side frame members 13 and 14 by means of bolts 52.

As will readily be seen in Fig. 4, the shutter elements 33 are mounted in two series so that when they are closed, each element is directed away from the center. The shutter elements 33 shown on the right hand side of Figs. 3 and 4 are provided at their upper ends with rearwardly directed lugs 53 which are pivotally connected to a common actuating bar 54. The shutter elements of the series shown on the left hand side of Figs. 3 and 4, except the innermost element are provided with similar lugs 53 pivotally connected to a similar actuating bar 54. In order to provide for the actuation of the innermost element of this series, I connect it to the adjacent element of said series by means of a link 55, pivotally connected to lugs 56 projecting rearwardly from these elements adjacent the lower edge of said innermost element.

The actuating bars 54 carry upstanding studs 57 which extend through openings 58 in the plate 46, configured to permit movement of the studs 57 during the opening and closing of the shutters. The studs 57 are connected by links 59 to bell crank levers 60, the other ends of which are provided with slotted openings 61. In these openings is received a pin 62 carried between the legs of the bifurcated end of a rod 63 which extends forwardly from a thermostat 64. The thermostat 64 is preferably located within the liquid chamber of the radiator above the core 12 so that it is actuated in accordance with the temperature of the cooling medium in the circulatory system of the engine. It will readily be understood that when the thermostat 64 expands under the influence of increasing temperature, the rod 63 is projected forwardly, actuating the shutter elements 33 through the bell crank lever 60 and the links 59 so as to open them. Springs 65 connected to the plate 46 and to the links 59 oppose this opening movement and effect the closing of the shutter elements when the temperature falls below a predetermined point, so that the operation of the shutter is automatic.

Although the invention has been has been disclosed in connection with the specific details of the preferred embodiment thereof, it must be understood that such details are not entitled to be limitative of the invention except insofar as set forth in the accompanying claims.

Having thus described my invention, what I claim as new and desire to secure by Letters Patent is:

1. A radiator shutter comprising a frame adapted to be mounted on a radiator so as to extend below the radiator core, shutter elements pivotally mounted in said frame and extending below the core, and an apron adapted to be located below the core and behind the shutters.

2. A radiator shutter comprising a frame adapted to be mounted in front of a radiator core so as to extend therebelow, a series of vertical shutter elements pivotally mounted in the frame, and an apron mounted on the inner side of the frame adapted to close the frame opening below the core.

3. A radiator shutter comprising a frame adapted to be mounted in front of a radiator core so as to extend therebelow, a series of vertical shutter elements pivotally mounted in the frame, an apron mounted on the inner side of the frame and in spaced relation to the shutter elements, said apron being adapted to close the frame opening below the core, the lower member of the frame extending to the apron and being provided with openings for the escape of foreign bodies.

4. In combination, a radiator shutter comprising a frame composed of an upper, a lower and two side frame members defining an opening, and a series of shutter elements pivotally mounted in said frame adapted to close the opening, said upper and lower frame members extending rearwardly from the shutter elements to provide a chamber between the shutter elements and the radiator core, said lower frame member being provided with perforations to permit foreign bodies to escape from said chamber, and a radiator shell having a rearwardly extending portion below said lower frame member to prevent inflow of air through the openings therein.

5. A radiator shutter comprising an upper frame member, a lower frame member and side frame members defining an opening larger than the radiator core to which it is to be applied, an apron on the inner side of the radiator frame adapted to close the shutter opening below the core, said apron being provided with a crank opening, a series of vertical shutter elements pivotally supported in the shutter opening, the upper and lower frame members being adapted to support said shutter elements, and means located above the crank opening for supporting the lower ends of the central shutter elements.

6. A radiator shutter comprising an upper frame member, a lower frame member and side frame members defining an opening larger than the radiator core to which it is to be applied, an apron on the inner side of the radiator frame adapted to close the shutter opening below the core, said apron being provided with a crank opening, a housing around said crank opening extending forwardly into alignment with the lower frame member, a series of vertical shutter elements adapted to be pivotally supported upon the upper and lower frame members and said housing, and means for closing the forward end of said housing.

7. In a radiator shutter, a frame comprising an upper frame member, a lower frame member, and side frame members, each side frame member having an outwardly directed face flange, the outer edge of which is turned forwardly and outwardly to enter into the interior of bead formed in a radiator shell.

8. In a radiator shutter, a frame comprising an upper frame member, a lower frame member, and side frame members, each side frame member comprising a vertical web adapted to lie in a longitudinal plane of the automotive vehicle to which the shutter is attached, said vertical web giving into an inwardly and forwardly directed web, which gives into an outwardly directed flange, the outer edge of which is turned forwardly and outwardly to engage a radiator shell.

9. In a radiator shutter frame, side frame members and a lower frame member, an apron integral with the lower frame member adapted to engage the rear edges of the side frame members, and flanges carried by said apron engaging and secured to the outer faces of the side frame members.

10. In a radiator shutter frame, side frame members and a lower frame member, an apron integral with the lower frame member adapted to engage the rear edges of the side frame members, flanges securing the side and lower frame members together, and flanges securing the apron and side frame members together.

11. In a radiator shutter, a frame defining an opening, a pair of series of vertical shutter elements pivotally mounted in said frame, lugs on the elements of one series, an actuating bar to which said lugs are pivotally connected, lugs on the elements of the other series except the innermost elements, an actuating bar to which said lugs are pivotally connected, means for actuating both bars simultaneously, and means linking said innermost element to another element of the same series whereby it may be operated simultaneously therewith.

12. In a radiator shutter, a frame defining an opening, a pair of series of vertical shutter elements operating in opposite directions pivotally mounted in said frame, lugs on the elements of one series, an actuating bar to which said lugs are pivotally connected, lugs on the elements of the other series, an actuating bar to which said lugs are pivotally connected, a bell crank lever connected to each actuating bar, and a rod secured to both bell crank levers to operate both series of shutter elements simultaneously.

13. In a radiator shutter, a frame defining an opening, a pair of series of vertical shutter elements operating in opposite directions pivotally mounted in said frame, lugs on the elements of one series, an actuating bar to which said lugs are pivotally connected, lugs on the elements of the other series, an actuating bar to which said lugs are pivotally connected, a bell crank lever connected to each actuating bar, and a rod secured to both bell crank levers adapted to open both series of elements simultaneously, and means normally tending to close said shutters.

14. In a radiator shutter, a frame defining an opening, said frame being configured to engage a radiator shell, which is bowed forwardly, a pair of series of vertical shutter elements pivotally mounted adjacent the front of the frame, lugs on the elements of one series, an actuating bar to which said lugs are pivotally connected, lugs on the elements of the other series, an actuating bar to which said lugs are pivotally connected, a bell crank lever pivotally connected to each bar, and a member secured to both levers to open the shutters simultaneously.

15. In a radiator shutter, a frame defining an opening, said frame being configured to engage a radiator shell which is bowed forwardly, a pair of series of vertical shutter elements operating in opposite directions pivotally mounted in said frame, one series being arranged at an angle to the other, lugs on the elements, an actuating bar to which the lugs of one series of elements are pivotally connected, an actuating bar to which the lugs of the other series are pivotally connected, a bell crank lever connected to each actuating bar, and means secured to both bell crank levers whereby both series of shutter elements may be opened simultaneously.

16. In a radiator shutter, a frame, shutter elements mounted therein, said frame comprising side frame members each of which is adapted to project forwardly to engage the radiator shell and support same against lateral movement in both directions.

17. In combination, a radiator shutter and a radiator shell, the shell having a rearwardly open bead in its front face and the shutter comprising a frame having forwardly directed extensions provided with lateral flanges which are adapted to enter said bead and support the shell against lateral displacement in both directions.

18. In combination, a radiator having a core through which air is adapted to pass, said core having a flat forward face, a radiator shutter in front of said core defining an opening substantially larger than said core, and shutter elements in said frame spaced from said core by varying amounts to provide an air chamber between the elements and the core.

19. In a radiator shutter, a frame defining an opening adapted to be closed by two sets of movable shutter elements extending in the same general direction, a pair of series of shutter elements operating in opposite directions, the shutter elements being pivotally mounted in said frame, with one series of shutter elements arranged at an angle to the other, said shutter elements having actuating lugs, an actuating link pivotally connected to the lugs of one series of shutter elements, an actuating link pivotally connected to the other lugs of the series of shutter elements, an operating rod for operating both said series of shutter elements simultaneously, and bell crank means having arms connected to said actuating links, said bell crank means also being connected to said operating rod, and including a pivot member movably mounted with respect to said frame, and effecting simultaneous closure of the shutter elements of both said series.

EDGAR G. PETERSEN.